US 9,710,355 B2
Jul. 18, 2017

(12) United States Patent
Bartolomeo et al.

(54) SELECTIVE LOADING OF CODE ELEMENTS FOR CODE ANALYSIS

(75) Inventors: David Bartolomeo, Woodinville, WA (US); Todd L. King, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1444 days.

(21) Appl. No.: 12/687,154

(22) Filed: Jan. 14, 2010

(65) Prior Publication Data

US 2011/0173594 A1 Jul. 14, 2011

(51) Int. Cl.
  *G06F 9/44* (2006.01)
  *G06F 9/45* (2006.01)
  *G06F 11/36* (2006.01)

(52) U.S. Cl.
  CPC ......... *G06F 11/3604* (2013.01); *G06F 11/36* (2013.01)

(58) Field of Classification Search
  None
  See application file for complete search history.

(56) References Cited

U.S. PATENT DOCUMENTS

| | | | |
|---|---|---|---|
| 5,452,449 A * | 9/1995 | Baldwin et al. | |
| 5,872,973 A * | 2/1999 | Mitchell et al. | 719/332 |
| 5,898,872 A * | 4/1999 | Richley | 717/121 |
| 5,909,575 A * | 6/1999 | Perry | 713/100 |
| 6,077,313 A * | 6/2000 | Ruf | 717/155 |
| 6,339,841 B1 * | 1/2002 | Merrick et al. | 717/166 |
| 6,865,730 B1 * | 3/2005 | Burke et al. | 717/116 |
| 7,039,923 B2 * | 5/2006 | Kumar et al. | 719/331 |
| 7,069,547 B2 * | 6/2006 | Glaser | 717/154 |
| 7,194,475 B2 * | 3/2007 | DelMonaco et al. | |
| 7,219,329 B2 | 5/2007 | Meijer et al. | |
| 7,308,684 B2 * | 12/2007 | Chan | 717/159 |
| 7,367,015 B2 | 4/2008 | Evans et al. | |
| 7,380,242 B2 | 5/2008 | Alaluf | |
| 7,409,679 B2 * | 8/2008 | Chedgey et al. | 717/144 |

(Continued)

FOREIGN PATENT DOCUMENTS

| | | |
|---|---|---|
| CN | 101162428 A | 4/2008 |
| CN | 101211262 A | 7/2008 |

OTHER PUBLICATIONS

Nachiappan Nagappan and Thomas Ball. "Static Analysis Tools as Early Indicators of Pre-Release Defect Density". ICSE '05. May 15-21, 2005. pp. 580-586.*

(Continued)

*Primary Examiner* — Lewis A Bullock, Jr.
*Assistant Examiner* — Mark Gooray
(74) *Attorney, Agent, or Firm* — Fiala & Weaver P.L.L.C.

(57) ABSTRACT

Systems and methods are described herein for selectively loading code elements included in a plurality of software entities comprising a target software entity and one or more reference software entities to facilitate analysis of the target software entity by a code analysis tool, such as a static code analysis tool. In one embodiment, all of the code elements in the target software entity are loaded while only those code elements included in the reference software entities that are determined to be most important from a dependency standpoint are loaded. The loaded code elements may be used to obtain suitable definitions of the code elements included in the target software entity for the purpose of code analysis.

20 Claims, 7 Drawing Sheets

(56) References Cited

U.S. PATENT DOCUMENTS

| | | | |
|---|---|---|---|
| 7,458,073 B1* | 11/2008 | Darling et al. | 717/168 |
| 7,496,904 B2 | 2/2009 | Srivastava et al. | |
| 7,543,271 B2 | 6/2009 | Gadre | |
| 7,818,730 B1* | 10/2010 | Ryan et al. | 717/140 |
| 7,844,958 B2* | 11/2010 | Colton | G06F 8/52 |
| | | | 717/146 |
| 2003/0037320 A1* | 2/2003 | Lovvik et al. | 717/148 |
| 2003/0172368 A1* | 9/2003 | Alumbaugh et al. | 717/106 |
| 2007/0256069 A1* | 11/2007 | Blackman et al. | 717/170 |
| 2008/0201705 A1* | 8/2008 | Wookey | 717/175 |
| 2008/0295066 A1* | 11/2008 | Dengler et al. | 717/104 |
| 2008/0313624 A1* | 12/2008 | Iwamoto | 717/162 |
| 2009/0125919 A1 | 5/2009 | Meijer et al. | |

OTHER PUBLICATIONS

Nachiappan Nagappan and Thomas Ball. "Using Software Dependencies and Churn Metrics to Predict Field Failures: An Empirical Case Study". ESEM 2007. Sep. 20-21, 2007. pp. 364-373.*

"Subset." Wikipedia. Wikimedia Foundation, Oct. 24, 2014. <http://en.wikipedia.org/wiki/Subset>.*

Lisa K. Fleischer, Bruce Hendrickson, Ali Pinar. "On Identifying Strongly Connected Components in Parallel", In IPDPS Workshops. 2000. pp. 505-511.*

McCaffrey, James, "Determining .NET Assembly and Method References", Retreived at<<http://msdn.microsoft.com/en-us/magazine/cc163641.aspx>>, 2006, pp. 9.

"Best Practices for Assembly Loading", Retreived at<<http://msdn.microsoft.com/en-us/library/dd153782.aspx>>, Oct. 2008, pp. 6.

"Assemblies", Retreived at<<http://www.diranieh.com/NETAssemblies/Assemblies.htm#Loading%20and%20Resolving%20Assemblies>>, Oct. 22, 2009, pp. 11.

Office Action and Search report issued in Chinese Patent Application No. 201110026284.8, Mail Date: Aug. 5, 2014, 13 Pages.

Office Action and Search Report issued in Chinese Patent Application No. 201110026284.8, Mail Date: Apr. 3, 2015, 10 Pages.

"Fourth Office Action Issued in Chinese Patent Application No. 201110026284.8", Mailed Date: Apr. 5, 2016, 10 Pages.

Third Office Action and Search Report Issued in Chinese Patent Application No. 201110026284.8, Mailed Date: Oct. 9, 2015, 13 Pages.

* cited by examiner

SELECTIVE LOADING OF CODE ELEMENTS FOR CODE ANALYSIS

BACKGROUND

At one time, software applications were monolithic blocks of executable code and data, although some application data such as variable settings could be maintained in separate files. In contrast, contemporary software applications and other executable code (such as operating system components) bind to and make use of self-contained software entities, each of which offers a set of functions that can be used by one or more applications or other executable code. The use of such self-contained software entities enables sharing of the same software entities by different applications, allows the executable files of applications to be kept smaller, enables large development projects to be broken down into smaller projects, and allows updating of the software entities without having to update the applications that use them.

An assembly is one such self-contained software entity. In particular, an assembly is a code library for use in deployment, versioning and security in the MICROSOFT® .NET framework. Assemblies are generated by compiling source code (e.g., C#, C++, or Visual Basic source code) using an appropriately configured compiler (e.g., a MICROSOFT® .NET compiler). An assembly includes metadata and intermediate language instructions. The metadata describes code elements defined in the source code, such as types, members (e.g., methods, fields, properties, events) and attributes. The intermediate language instructions are operation codes that perform operations when an assembly is executed. A just-in-time compiler that translates assemblies into machine-specific executable code facilitates the coordination of operation codes and portions of metadata at the time of execution.

Static code analysis tools exist that analyze software entities, such as assemblies, without actually having to execute the software entities or the applications that make use of them. Static code analysis tools may be used by developers to detect defects in software entities and/or to ensure compliance by the software entities with program specifications or development guidelines. Depending upon the implementation, static code analysis tools may be embodied as stand-alone applications or may comprise a part of an integrated development environment (IDE).

A static code analysis tool may be invoked to analyze an assembly that is part of a collection of assemblies used to implement an application or other executable code. The assembly to be analyzed may be termed the target assembly. To analyze a code element in the target assembly, the static code analysis tool may need to obtain a suitable definition of the code element from the target assembly metadata. However, it may be that the code element included in the target assembly cannot be suitably defined without reference to a second code element included in another assembly in the collection of assemblies. For example, it may be that a method of a particular type that is included in the target assembly cannot be suitably defined without reference to a definition of a type that is included in another assembly in the collection of assemblies. In this case, the first code element can be said to be dependent on the second code element. The second code element, in turn, may be dependent upon another code element located in another assembly in the collection and so on. Thus, to obtain a suitable definition of the first code element, the static code analysis tool may be required to read the target assembly as well as other assemblies that include code elements upon which the first code element depends either directly or indirectly. These other assemblies may be referred to as reference assemblies.

One conventional approach to ensuring that any such dependencies can be resolved by the static code analysis tool requires loading every assembly in the collection of assemblies into system memory prior to analysis of the target assembly. This may be referred to as loading the full closure of assemblies. Often times, this approach results in loading significantly more information that is actually needed and can introduce performance problems where system memory is limited. This approach can also introduce reliability problems because it requires that all the reference assemblies be accessible to the computer executing the static code analysis tool, which is not always the case.

Another conventional approach involves on-demand reading of assemblies to resolve dependencies. In accordance with this approach, when the static code analysis tool is reading a first code element in a first assembly and determines that the first code element refers to a second code element included in another assembly, the static code analysis tool will attempt to read the second code element from the other assembly at that time to resolve the dependency. If the second code element further depends on a third code element, then the static code analysis tool will also attempt to read the third code element to resolve the dependency at that time. This process continues until all direct and indirect dependencies of the first code element are resolved. For example, assume that a method A calls a method B, method B calls a method C, and method C calls a method D. In an implementation in which the load-on-demand approach is used to obtain a suitable definition of method A, the static code analysis tool will load all four methods and any types that those methods require. While this approach typically reduces the amount of information read out of each assembly as compared to the approach of loading the full closure of assemblies, this approach may still result in the loading of more information than is actually needed. For example, with continued reference to the previous example involving methods A, B, C and D, it may be that in order to obtain a suitable definition of method A, the static code analysis tool only needs to load a signature and method body of method A and just the signature of method B. Method C and D may not need to be loaded at all. In addition, the types that method B refers to may need only be named placeholders and thus need not be loaded from an actual assembly.

What is needed, then, is an improved system and method for loading code elements included in a plurality of software entities that include a target software entity and one or more reference software entities to facilitate analysis of the target software entity by a code analysis tool, such as a static code analysis tool. The improved system and method should address one or more of the shortcomings associated with conventional approaches to loading code elements as described above.

SUMMARY

Systems and methods are described herein for selectively loading code elements included in a plurality of software entities comprising a target software entity and one or more reference software entities to facilitate analysis of the target software entity by a code analysis tool, such as a static code analysis tool. The loaded code elements may be used to obtain suitable definitions of the code elements included in the target software entity for the purpose of code analysis.

The software entities may comprise MICROSOFT® .NET assemblies, although the invention is not so limited.

In accordance with certain embodiments described herein, the systems and methods assign a first subset of the code elements to a first group and assign a second subset of the code elements to a second group. Then, only the code elements assigned to the first group are loaded, wherein loading a code element comprises accessing the software entity in which the code element is included. In a further embodiment, the first group includes a first ring and a second ring, and assigning the first subset of the code elements to the first group includes assigning to the first ring all of the code elements included in the target software entity and assigning to the second ring any code element included in the one or more reference software entities upon which a code element included in the target software entity directly depends. In a still further embodiment, the second group includes a third ring and assigning the second subset of the code elements to the second group includes assigning to the third ring any code element included in the one or more reference software entities that has not been assigned to the second ring and upon which a code element assigned to the second ring directly depends. In further accordance with this embodiment, the systems and methods may additionally create a named placeholder for each code element assigned to the third ring. In a still further embodiment, any code element that is not assigned to the first, second or third rings is not loaded or represented by a named placeholder.

In accordance with certain further embodiments described herein, the systems and methods load all of the code elements included in the target software entity, wherein loading a code element includes reading the software entity that includes the code element. In further accordance with such embodiments, only a subset of the code elements included in the one or more reference software entities are selectively loaded, wherein the determination of whether a code element included in a reference software entity is loaded is based on a degree to which a code element included in the target software entity depends on the code element included in the reference software entity. Such selective loading may include, for example, determining a smallest number of dependency links between a code element included in the target software entity and a code element included in the one or more reference software entities and then loading the code element included in the one or more reference software entities if the smallest number of dependency links is less than n, wherein n is an integer greater than 1. In further accordance with such an embodiment, the systems and methods may create a named placeholder for the code element included in the one or more reference software entities if the smallest number of dependency links is equal to n.

In accordance with the foregoing, certain embodiments advantageously load only those code elements included in the reference software entities that are most important from a dependency standpoint for obtaining a suitable definition of the code elements included in the target software entity. Because the foregoing systems and methods load only a subset of the code elements included in the plurality of software entities, an embodiment advantageously loads less information into system memory than would be loaded using conventional approaches. This can lead to improved system performance, particularly when system memory is limited. Furthermore, since only a subset of the code elements need to be loaded, not every reference software entity must be accessible to the computing system executing the code analysis tool. This can lead to a reduction in reliability problems.

Additionally, an embodiment can render the performance of a code analysis tool more consistent and predictable. For example, in an embodiment in which the code analysis tool can apply any of a plurality of predefined or user-defined rules to a target software entity (wherein each rule may comprise, for example, a particular type of test that the static code analysis tool can perform in order to ensure conformance with certain standards, specifications or development guidelines, to detect defects in code, etc.) and each rule can request different data, the extent to which dependencies associated with code elements referenced by each rule can be resolved will be the same regardless of which rule(s) are applied. Thus, the set of code elements that will be loaded will not change depending on which rules are enabled.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Figure 1:
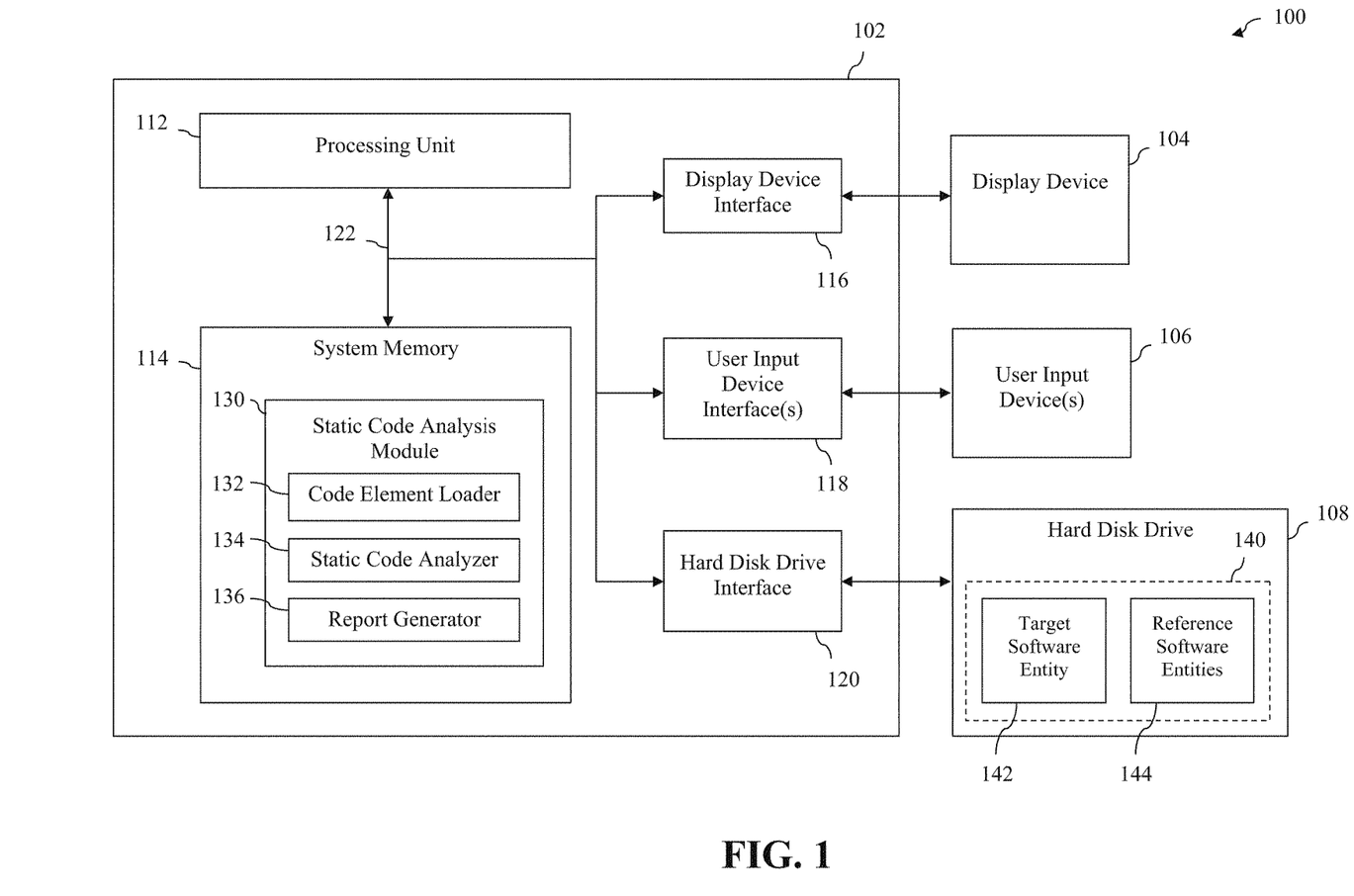
FIG. 1 is a block diagram of an example operating environment in which an embodiment may be implemented.

II. Example Systems and Methods for Selectively Loading Code Elements for Code Analysis FIG. 1 is a block diagram of an example operating environment in which an embodiment may be implemented. In particular, FIG. 1 is a block diagram of a system 100 that is configured to perform code analysis, such as static code analysis, on one or more software entities. As shown in FIG. 1, system 100 includes a processor-based computing platform 102 as well as a display device 104, one or more user input devices 106, and a hard disk drive 108, each of which is communicatively connected to computing platform 102. System 100 is intended to broadly represent any processor-based system upon which software may be executed for the benefit of a user. For example and without limitation, system 100 may comprise a desktop computing system, a laptop computer, or a tablet computer. Still further, system 100 may comprise a video gaming system, a personal digital assistant (PDA), a smart phone, or a portable media player. A specific example of a processor-based computer system that may be used to implement system 100 will be described subsequently herein in reference to FIG. 9.

As further shown in FIG. 1, computing platform 102 includes at least a processing unit 112, system memory 114, a display device interface 116, one or more user input device interfaces 118, and a hard disk drive interface 120. These components are interconnected via a communication infrastructure 122, which may comprise for example one or more bus structures.

Processing unit 112 comprises one or more processors or processor cores that are configured to execute software modules and to access data stored in system memory 114. The software modules stored in system memory 114 include at least a static code analysis module 130. System memory 114 is intended to broadly represent any type of memory that may be used to store software modules and data to be executed and accessed by processing unit 112, respectively. In one embodiment, system memory 114 comprises volatile memory, such as random access memory (RAM).

Display device interface 116 comprises an interface that renders video or graphics information received from processing unit 112 or system memory 114 for display on display device 104. Display device interface 116 may comprise, for example, a video or graphics card that is configured to perform video or graphics rendering operations. Depending upon the implementation of system 100, display device 104 may comprise a monitor, a projector, or other type of display device that is physically separate from computing platform 102 and connected thereto via a suitable wired and/or wireless connection, or a display device that is integrated within the same physical structure as computing platform 102, such as an integrated display in a laptop computer, tablet computer, PDA or portable media player.

User input device interface(s) 118 comprise one or more interfaces for receiving user input information generated by user input device(s) 106 and for passing such input information to processing unit 112 for processing thereof. Depending upon the implementation, user input device(s) 106 may include a mouse, a keyboard, a touch pad, a trackball, a joystick, a pointing stick, a touch screen (e.g., a touch screen integrated with display device 104), a wired glove, a motion tracking sensor, a game controller or gamepad, or a video capture device such as a camera. However, these examples are not intended to be limiting and user input device(s) 106 may include other types of devices other than those listed herein. Depending upon the implementation, each user input device 106 may be physically separate from computing platform 102 and connected thereto via a suitable wired and/or wireless connection, or may be integrated within the same physical structure as computing platform 102, such as an integrated keyboard, touchpad, or touch screen on a laptop computer, tablet computer, PDA or portable media player.

Hard disk drive interface 120 comprises a suitable interface for reading and writing data to hard disk drive 108, which is a well-known type of non-volatile storage device that stores digitally encoded data on rapidly rotating platters with magnetic surfaces. Depending on the implementation, hard disk drive interface 120 may comprise a Parallel Advanced Technology Attachment (P-ATA, also called IDE or EIDE) interface, a Serial ATA (SATA) interface, a Small Computer System Interface (SCSI), a Serial Attached SCSI, a Fibre Channel interface, or a Universal Serial Bus (USB) interface, although these are only some examples.

Static code analysis module 130 is a software module that, when executed by processing unit 112, analyzes self-contained software entities without actually having to execute the software entities or any applications or other executable code that make use of them. Static code analysis module 130 may be executed by a user, such as a software developer, to detect defects in such software entities and/or to ensure compliance by such software entities with program specifications or development guidelines. Depending upon the implementation, static code analysis module 130 may be implemented as a stand-alone application or comprise a part of an integrated development environment (IDE), such as MICROSOFT® VISUAL STUDIO® TEAM SYSTEM or the like. Additionally, static code analysis module 130 may be implemented as a feature that is automatically executed by a compiler when compiling a self-contained software entity.

Features of static code analysis module 130 may be invoked by the user via manipulation of one or more of user input device(s) 106. The user input information generated through such manipulation is passed to processing unit 112 via user input device interface(s) 118. During execution of static code analysis module 130, information generated by the module may be rendered to display device 104 via display device interface 116 for viewing by the user.

As shown in FIG. 1, static code analysis module 130 includes a number of components or sub-modules including a code element loader 132, a static code analyzer 134 and a report generator 136, each of which is configured to perform certain functions when executed by processing unit 112. In particular, code element loader 132 is configured to load into system memory 114 code elements that are included in a software entity to be analyzed by static code analysis module 130. Static code analyzer 134 is configured to analyze the code elements that have been loaded by code element loader 132 as well as other aspects of the software entity to be analyzed (such as, for example, code behaviors). In one embodiment, static code analyzer 134 is configured to analyze the loaded code elements and the other aspects of the software entity to be analyzed in accordance with one or more predefined or user-defined rules. Each rule may comprise, for example, a particular type of test that static code analyzer 134 can perform in order to ensure conformance with certain standards, specifications or development guidelines, to detect defects in code, etc. Report generator 136 is configured to generate reports concerning the results of the analysis performed by static code analyzer 134. Such reports may describe, for example, defects detected in the software entity that was analyzed or aspects of the software entity that were deemed non-compliant with respect to certain program specifications or development guidelines. Such reports may be rendered to display device 104 via display device interface 116 for viewing by a user. Alternatively or additionally, such reports may be stored in one or more files that are located on hard disk drive 108 or printed via a printer connected to computing platform 102 (not shown in FIG. 1).

Static code analysis module 130 may be invoked to analyze a software entity that is part of a collection of software entities used to implement an application or other executable code. Such a collection of software entities is shown as software entities 140 in system 100. The software entity to be analyzed is represented as target software entity 142. To enable static code analysis module 130 to analyze a code element in target software entity 142, code element loader 132 is required to obtain a suitable definition of the code element. Such a definition may be obtained by reading information stored in target software entity 142. However, it may be that the code element included in target software entity 142 cannot be suitably defined without reference to a second code element included in another software entity in collection of software entities 140. For example, it may be that a method of a particular type that is included in target software entity 142 cannot be suitably defined without reference to a definition of the type that is included in another software entity in collection of software entities 140. In this case, the first code element can be said to be dependent on the second code element. The second code element, in turn, may be dependent upon another code element located in another software entity in collection 140 and so on. Thus, to obtain a suitable definition of the first code element, code element loader 132 may be required to read target software entity 142 as well as various other software entities in collection 140 that include code elements upon which the first code element depends either directly or indirectly. These other software entities are represented as reference software entities 144 in system 100.

In one embodiment, each of target software entity 142 and each of reference software entities 144 comprise an assembly. As will be appreciated by persons skilled in the relevant art(s), an assembly is a code library for use in deployment, versioning and security in the MICROSOFT® .NET framework. Assemblies are generated by compiling source code (e.g., C#, C++, or Visual Basic source code) using an appropriately configured compiler (e.g., a MICROSOFT® .NET compiler).

An assembly includes a manifest, code element metadata, and intermediate language instructions. The assembly manifest includes metadata that specifies the version requirements and the security identity of the assembly, enumerates the file(s) that make up the assembly, describes how references to code elements and resources of the assembly are mapped to file(s) that contain their declarations and implementations, and enumerates other assemblies upon which the assembly depends. The code element metadata describes code elements defined in the source code, such as types, members (e.g., methods, fields, properties, events) and attributes. The intermediate language instructions are operation codes that perform operations when an assembly is executed. A just-in-time compiler that translates assemblies into machine-specific executable code facilitates the coordination of operation codes and portions of metadata at the time of execution. An assembly may also include resources (such as .bmp or .jpg files, for example) that are utilized by the assembly when executed.

Figure 2:
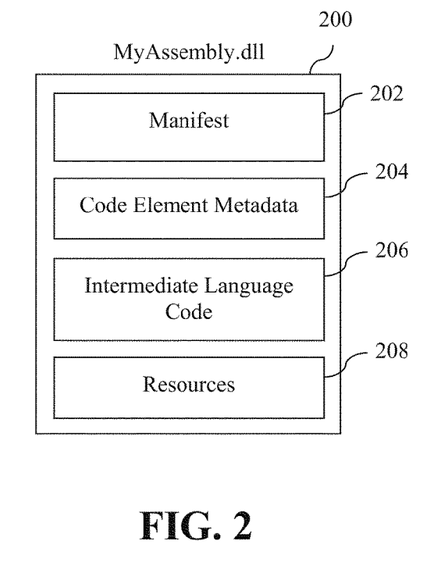
FIG. 2 is a block diagram of an assembly in which all the assembly elements are grouped into a single physical file.
Figure 3:
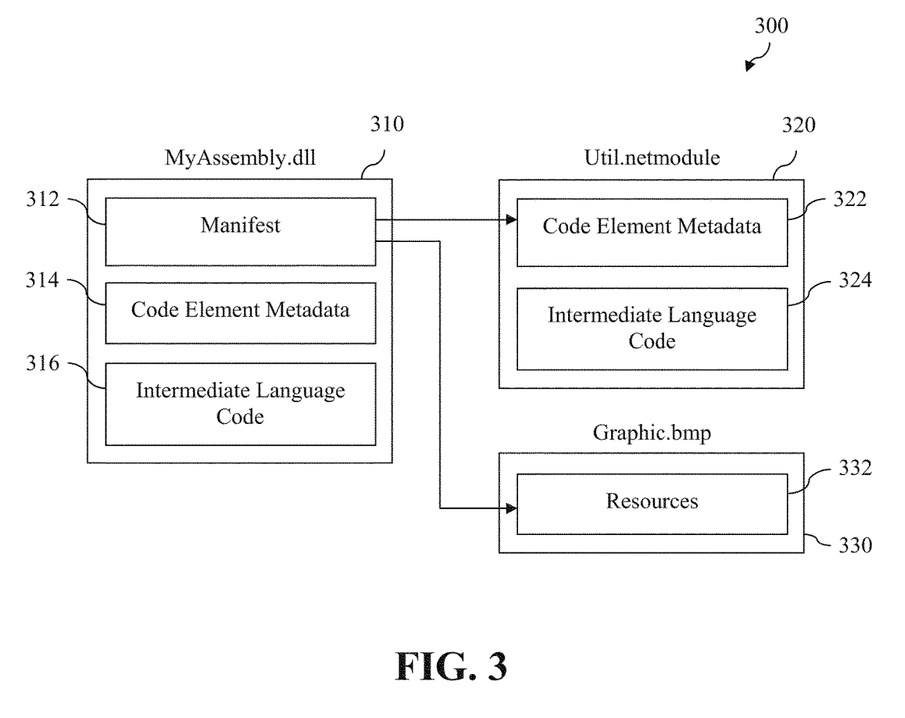
FIG. 3 is a block diagram of an assembly in which the assembly elements are contained in multiple physical files.

All of the elements of an assembly may be grouped into a single physical file. FIG. 2 is a block diagram of an example assembly that comprises a single physical file 200 denoted "MyAssembly.dll." File 200 includes a manifest 202, code element metadata 204, intermediate language code 206 and resources 208. Alternatively, the elements of an assembly can be contained in several physical files. These files can be modules of compiled code, resources, or other files required by an application or other executable code. Multi-file assemblies may be used, for example, to combine modules written in different languages or to optimize downloading an application by putting seldom used code elements in a module that is downloaded only when needed. FIG. 3 is a block diagram of an example assembly that is contained in several physical files. In particular, assembly 300 is contained in three files: file 310, denoted "MyAssembly.dll," file 320 denoted "Util.netmodule" and file 330 denoted "Graphic.bmp." File 310 includes a manifest 312, code element metadata 314 and intermediate language code 316. File 320 includes a separate set of code element metadata 322 and intermediate language code 324. File 330 includes resources 332. The three files are logically linked together by metadata stored in manifest 312, which when interpreted by a MICROSOFT® .NET managed runtime, causes the managed runtime to treat the files as a logical unit.

Although assemblies are described herein as examples of software entities 140, it is to be understood that software entities 140 are not limited to assemblies. Rather, software entities 140 may comprise any type of self-contained software entities that provide one or more functions that can be used by one or more applications or other executable code.

As shown in FIG. 1, collection of software entities 140 is stored on hard disk drive 108. Thus, to read information from target software entity 142 and reference software entities 144, code element loader 132 must access hard disk drive 108 via hard disk drive interface 120. Although collection 140 is shown stored on hard disk drive 108 connected to computing platform 102 in FIG. 1, persons skilled in the relevant art(s) will readily appreciate that collection of software entities 140 may be stored on any type of non-volatile storage device or system that can be communicatively connected to computing platform 102 via a suitable wired or wireless interface. For example, collection 140 may be stored on a remote storage system or device that is connected to computing platform 102 via a local area or wide area network, although this is only an example.

As noted above, due to dependencies between code elements, code element loader 132 may be required to access multiple software entities in order to obtain a suitable definition of a code element included in target software entity 142. As described in the Background Section, one approach to ensure that any such dependencies can be resolved would involve configuring code element loader 132 to load every software entity in collection 140 into system memory 114 prior to analysis of target software entity 142. However, this approach can result in the loading of significantly more information than is necessary and can adversely affect the performance of system 100, particularly where system memory 114 is limited. This approach can also introduce reliability problems if not all of reference software entities 144 are stored on hard disk drive 108 or are otherwise accessible to computing platform 102.

As also described in the Background Section, another approach to ensuring that dependencies between code elements can be resolved involves configuring static code analysis module 130 to perform on-demand reading of software entities to resolve dependencies. In accordance with this approach, when static code analysis module 130 is analyzing a first code element in a first software entity and determines that the first code element refers to a second code element included in another software entity, static code analysis module 130 will attempt to read the second code element from the other software entity at that time to resolve the dependency. If the second code element further depends on a third code element, then static code analysis module 130 will attempt to read the third code element to resolve the dependency at that time. This process continues until all direct and indirect dependencies of the first code element are resolved. While this approach reduces the amount of information read out of each software entity as compared to the approach of loading all the software entities in collection 140, this approach may still result in the loading of more information than is actually needed.

To overcome these shortcomings associated with conventional approaches, in accordance with one embodiment, code element loader 132 is configured to selectively load only a subset of all the code elements described by the software entities in collection 140 prior to analysis of target software entity 142 by static code analyzer 134. Then, during analysis of target software entity 142, static code analyzer 134 uses the loaded code elements to resolve dependencies necessary to obtain suitable definitions of the code elements included in target software entity 142. The subset of code elements selected for loading by code element loader 132 includes only those code elements that are determined to be most important or necessary for obtaining such a suitable description.

By loading only the subset of the code elements that are necessary to provide suitable definitions of the code elements included in target software entity 142, code element loader 132 advantageously loads less information into system memory 114 than would be loaded using conventional approaches. This can lead to improved system performance, particularly when system memory 114 is limited. Furthermore, since only a subset of the code elements need to be loaded, not every reference software entity 144 must be stored on hard disk drive 108. This can lead to a reduction in reliability problems. For example, using a conventional approach, two different systems having access to two different sets of assemblies may produce different results or experience different performance when analyzing the same software entity. The approach described herein can help to avoid these issues.

In accordance with this approach, the performance of static code analyzer 134 may also be rendered more consistent and predictable. For example, in an embodiment in which static code analyzer can apply any of a plurality of predefined or user-defined rules to target software entity 142 and each rule can request different data, the extent to which dependencies associated with code elements referenced by each rule can be resolved will be the same regardless of which rule(s) are applied. Thus, the set of code elements that will be loaded will not change depending on which rules are enabled. The manner by which code element loader 132 operates to load code elements included in software entities 140 will now be further described with reference to FIGS. 4-8.

Figure 4:
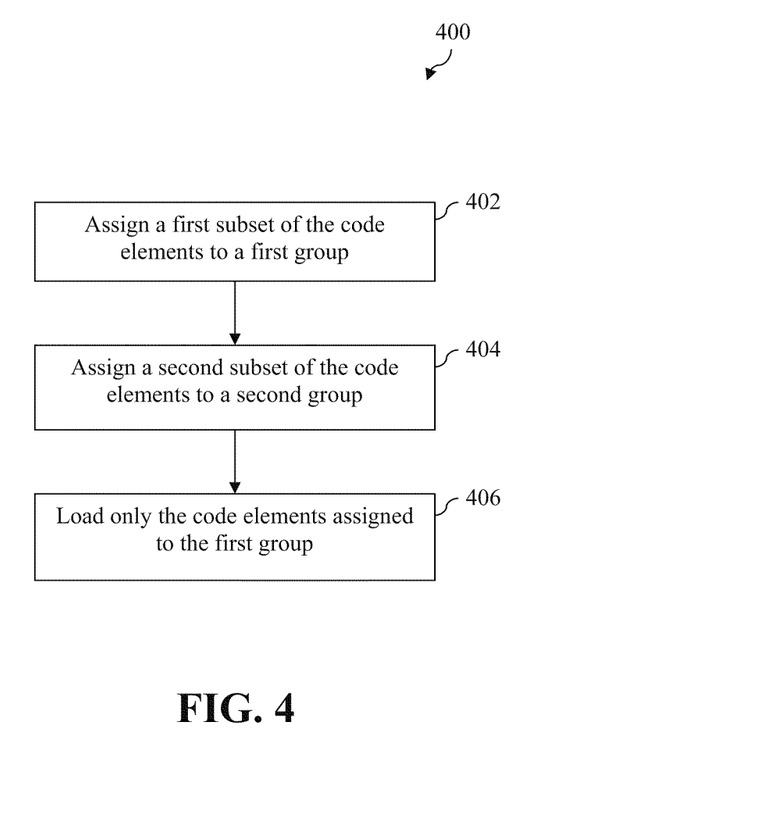
FIG. 4 depicts a flowchart of a method for loading code elements included in a plurality of software entities comprising a target software entity and one or more reference software entities to facilitate analysis of the target software entity by a code analysis tool.

FIG. 4 depicts a flowchart 400 of a general method for loading code elements included in a plurality of software entities comprising a target software entity and one or more reference software entities to facilitate analysis of the target software entity by a code analysis tool in accordance with an embodiment. In an embodiment, each of the software entities comprises a MICROSOFT® .NET assembly, although this is merely one non-limiting example. In a further embodiment, the code analysis tool comprises a static code analysis tool. However, the method may conceivably be used to load code elements for other types of code analysis tools. As previously noted, the code elements may comprise one or more of a type, method, property, field and event, although these examples are not intended to be limiting.

Although the method of flowchart 400 will be described herein in reference to various elements of system 100 as described above in reference to FIG. 1, persons skilled in the relevant art(s) will readily appreciate that the method is not limited to that implementation and may be implemented by other systems or elements.

The method of flowchart 400 may be performed by static code analysis module 130 responsive to receiving an indication from a user that the user wishes for an analysis to be performed on target software entity 142 in collection of software entities 140.

As shown in FIG. 4, the method of flowchart 400 begins at step 402 in which code element loader 132 assigns a first subset of the code elements included in collection of software entities 140 to a first group. Assigning a code element to the first group may comprise, for example, associating an indicator with the code element or a representation of the code element in system memory 114 that indicates that the code element is assigned to the first group or including the code element in a list, table or other collection of code elements that are assigned to the first group.

At step 404, code element loader 132 assigns a second subset of the code elements included in collection of software entities 140 to a second group. Assigning a code element to the second group may comprise, for example, associating an indicator with the code element or a representation of the code element in system memory 114 that indicates that the code element is assigned to the second group or including the code element in a list, table or other collection of code elements that are assigned to the second group.

At step 406, code element loader 132 loads only the code elements assigned to the first group. Loading a code element may comprise accessing the software entity in which the code element is included on hard disk drive 108 (or other non-volatile storage device or system) and reading the code element, or a portion thereof, into system memory 114. Once loaded, the code elements can then be used by static code analyzer 134 to resolve dependencies and thereby obtain suitable definitions of code elements located in target software entity 142.

Figure 5:
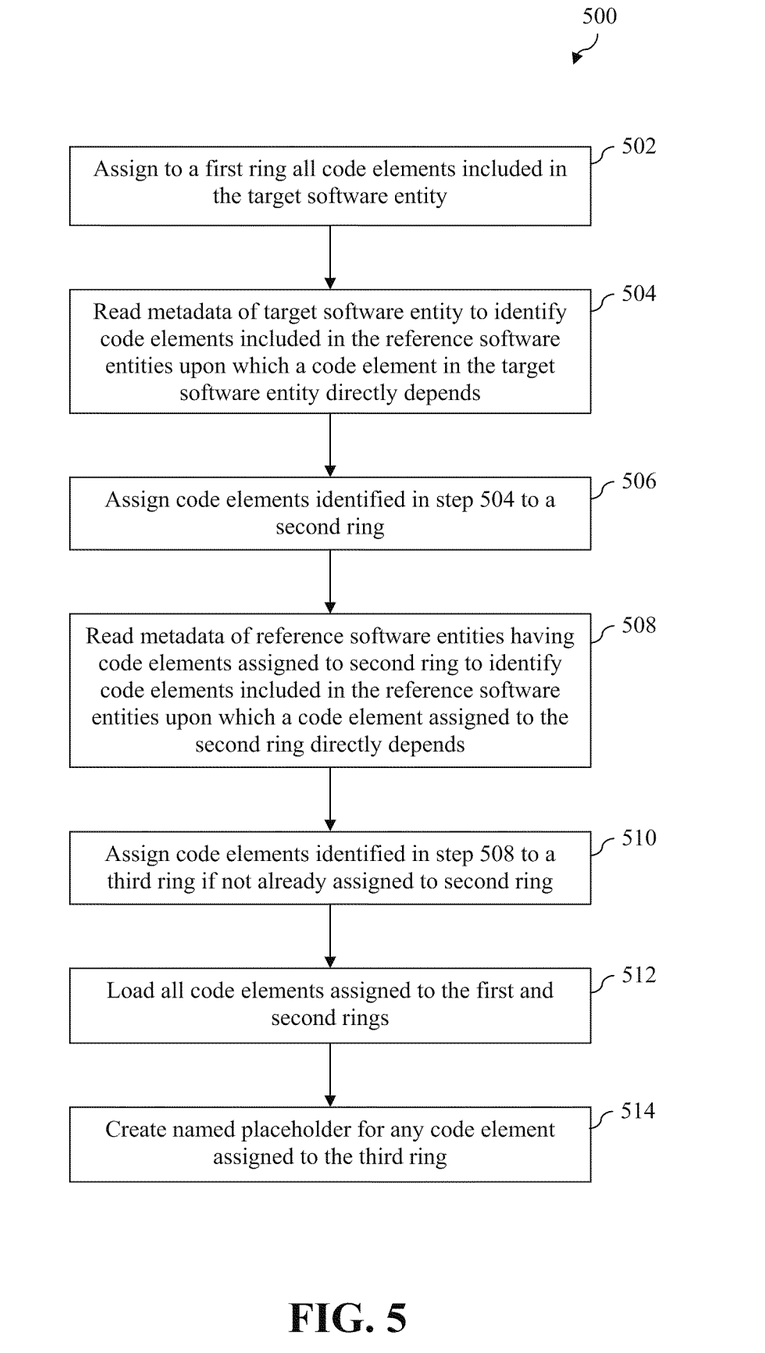
FIG. 5 depicts a flowchart of a particular implementation of the method of the flowchart of FIG. 4 that utilizes a ring model for selecting code elements for loading.

FIG. 5 depicts a flowchart 500 of a particular implementation of the method of flowchart 400 that utilizes a ring model for selecting code elements for loading. In particular, in flowchart 500, step 402 of assigning a first subset of the code elements to the first group is implemented via steps 502, 504 and 506, step 404 of assigning a second subset of the code elements to the second group is implemented via steps 508 and 510, and step 406 of loading only the code elements assigned to the first group is implemented via step 512. Although the method of flowchart 500 will also be described herein in reference to various elements of system 100 as described above in reference to FIG. 1, persons skilled in the relevant art(s) will readily appreciate that the method is not limited to that implementation and may be implemented by other systems or elements.

As shown in FIG. 5, the method of flowchart 500 begins at step 502 in which code element loader 132 assigns to a first ring all code elements included in target software entity 142.

At step 504, code element loader 132 reads metadata of target software entity 142 to identify code elements included in reference software entities 144 upon which a code element in target software entity 142 directly depends. In one embodiment, reading the metadata comprises reading code element metadata located in a MICROSOFT® .NET assembly, although this is only an example.

At step 506, code element loader 132 assigns any code elements identified during step 504 to a second ring.

At step 508, code element loader 132 reads metadata of reference software entities having code elements assigned to the second ring to identify code elements included in the reference software entities upon which a code element assigned to the second ring directly depends. In one embodiment, reading the metadata comprises reading code element metadata located in a MICROSOFT® .NET assembly, although this is only an example.

At step 510, code element loader 132 assigns code elements identified during step 308 to a third ring if such code elements have not already been assigned to the second ring.

At step 512, code element loader 132 loads all of the code elements assigned to the first and second rings. As noted above, loading a code element may comprise accessing the software entity in which the code element is included on hard disk drive 108 (or other non-volatile storage device or system) and reading the code element, or a portion thereof, into system memory 114. Once loaded, the code elements can then be used by static code analyzer 134 to resolve dependencies and thereby obtain suitable definitions of code elements located in target software entity 142.

At step 514, rather than loading the code elements assigned to the third ring, code element loader 132 creates a named placeholder in system memory 114 for any code element assigned to the third ring. The named placeholder serves as a simple representation of a code element that is suitable for processing by static code analyzer 134.

The foregoing method of flowchart 500 essentially loads only those code elements deemed necessary for obtaining a suitable description of a code element in target software entity 142. In accordance with the method, a code element is deemed necessary for obtaining such a description if the code element is included in target software entity 142 or if the code element is included in one of reference software entities 144 and a code element located in target software entity 142 directly depends from it. The method of flowchart 500 will now be further explained with reference to a particular teaching example illustrated in FIG. 6.

Figure 6:
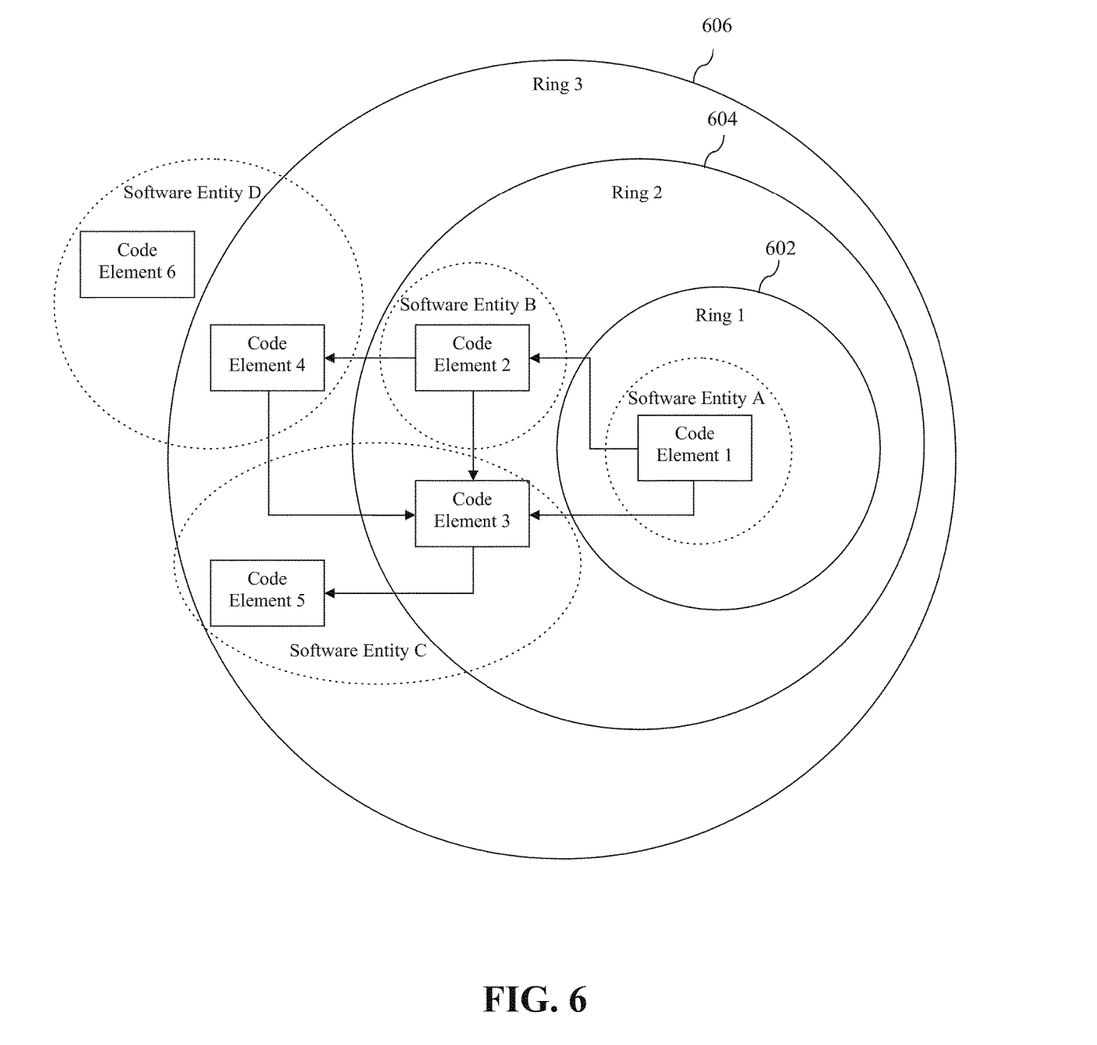
FIG. 6 is an illustration of the assignment of code elements to each of a plurality of rings in accordance with an embodiment.

In FIG. 6, the first, second and third rings referenced in flowchart 500 are shown as a first ring 602 (denoted "Ring 1"), a second ring 604 (denoted "Ring 2") and a third ring 606 (denoted "Ring 3"). These rings represent logical groupings of various code elements included in software entities 140 as tracked by code element loader 132. Furthermore, in FIG. 6, code element 1 is intended to represent a code element included in a target software entity referred to as "software entity A," code element 2 is intended to represent a code element included in a reference software entity referred to as "software entity B," code elements 3 and 5 are intended to represent code elements included in a reference software entity referred to as "software entity C," and code elements 4 and 6 are intended to represent code elements included in a reference software entity referred to as "software entity D."

As shown in FIG. 6, code element loader 132 has assigned code element 1 to first ring 602 in accordance with step 502 of flowchart 500 because code element 1 is included in software entity A, which is the target software entity. During execution of step 504, code element loader 132 reads the metadata of software entity A to identify code elements included in a group of reference software entities upon which code element 1 directly depends. As a result of this step, code element loader 132 determines that code element 1 directly depends from code element 2 included in software entity B and that code element 1 also directly depends from code element 3 included in software entity C. These dependencies are represented in FIG. 6 by the arrows directed from code element 1 to code element 2 and code element 3, respectively.

In accordance with step 506 of flowchart 500, code element loader 132 assigns code element 2 and code element 3 identified during step 504 to second ring 604.

During execution of step 508, code element loader 132 reads the metadata of software entity B and software entity C, as those software entities are reference software entities that have code elements assigned to second ring 604, and identifies code elements included in the group of reference software entities upon which code element 2 and code element 3 directly depend. As a result of this step, code element loader 132 determines that code element 2 directly depends from code element 3 included in software entity C and also from code element 4 included in software entity D and that code element 3 directly depends from code element 5 included in software entity C. These dependencies are represented in FIG. 6 by the arrows directed from code element 2 to code element 3 and code element 4, respectively, and by the arrow directed from code element 3 to code element 5.

In accordance with step 510, code element loader 132 assigns code elements 4 and 5 identified during step 508 to third ring 606 but does not assign code element 3 identified during step 508 to third ring 606 because code element 3 was already assigned to second ring 604.

In accordance with step 512, code element loader 132 loads all of the code elements assigned to first ring 602 and to second ring 604, which includes code element 1, code element 2 and code element 3. As shown in FIG. 6, to perform this step code element loader 132 must access software entity A, software entity B and software entity C. However, with respect to software entity B and software entity C, code element loader 132 need only load the code elements from these software entities that have been assigned to second ring 604.

In accordance with step 514, code element loader 132 creates named placeholders for the code elements assigned to third ring 606, which includes code element 4 and code element 5. These named placeholders may be created from information obtained from the metadata that was read in software entity B and software entity C during step 508. Thus, step 514 does not require the loading of any additional code elements.

In accordance with the example shown in FIG. 6, only software entity A, software entity B and software entity C need by accessed by code element loader 132. Software entity D need not be accessed at all since it does not contain any code elements in first ring 602 or second ring 604.

In the example of FIG. 6, code element 6 included in software entity D is not part of the dependency graph for code element 1. It is possible that the relevant software entities can contain hundreds or thousands of unrelated code elements such as code element 6 that do not appear in the dependency graph. In accordance with an embodiment, any code element that is not assigned to first ring 602, second ring 604 or third ring 606 comprises a code element that does not need to be loaded or for which a named placeholder need not be created. Thus, for example, code element 6 of software entity D does not need to be loaded and a named placeholder need not be created for this code element.

In contrast with the foregoing ring model approach, the conventional approach of loading all of the code elements in every software entity in collection 140 into system memory 114 prior to analysis of target software entity 142 would result in loading all of the code elements in software entities A, B, C and D. This could mean that hundreds or thousands of extra unneeded code elements would be loaded, thus negatively impacting the performance of static code analysis module 130 and potentially other software modules executing on computing platform 102. This approach also requires that software entity D be accessible to computing platform 102 in order to load code element 1 from software entity A. Requiring that software entity D be accessible to computing platform 102 will lead to unnecessary failures when software entity D is not so accessible. Thus, the ring model approach discussed above is an improvement over the strategy of loading all of the code elements in every software entity in collection 140 because it reduces the number of code elements that need to be loaded and it reduces the number of software entities that must be accessible to computing platform 102.

Using the conventional approach of performing on-demand reading of software entities to resolve dependencies, code elements 1 through 5 would have been loaded. This is because the load-on-demand approach does not have a notion of how necessary a code element is based on degree of dependency, and thus all code elements in the dependency graph for code element 1 are fully loaded. This does represent an improvement over the conventional approach that loads all code elements in software entities 140 as only the code elements in the dependency graph for code element 1 are loaded. For example, using the load-on-demand approach, code element 6 would not be loaded. However, the load-on-demand approach still requires that more code elements be loaded than the ring model approach described herein and also requires that software entity D be accessible to computing platform 102. Thus, the ring model approach described herein improves on the load-on-demand approach by not requiring that software entity D be accessible and also by reducing the number of code elements that need to be loaded.

It is noted that the ring model approach described herein need not be limited to any particular number of rings. In general, the concept involves starting with one or more core code elements that must be loaded and then examining the dependencies of that required set of code elements to selectively determine a set of additional code elements that should be loaded, wherein the determination of whether an additional code element is loaded is based on the ring to which the additional code element is assigned, and wherein the ring to which the additional code element is assigned is based on a degree to which a required code element depends on the additional code element.

Figure 7:
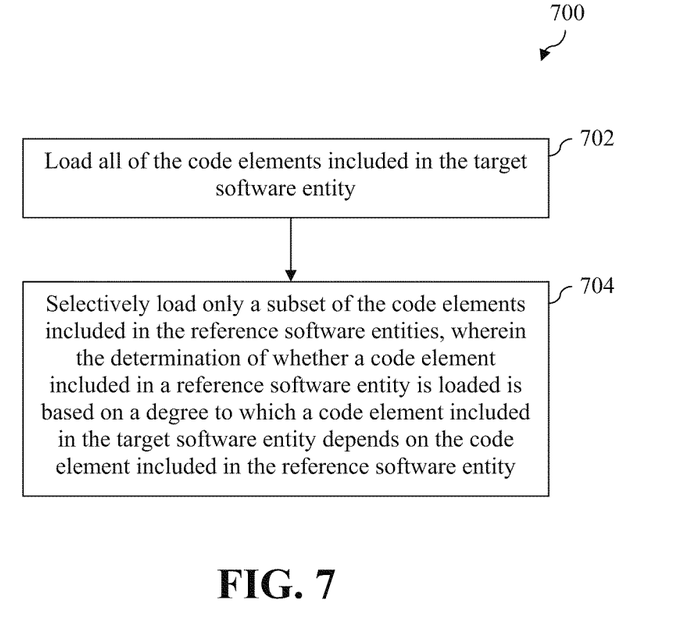
FIG. 7 depicts a flowchart of an alternate method for loading code elements included in a plurality of software entities comprising a target software entity and one or more reference software entities to facilitate analysis of the target software entity by a code analysis tool.

One implementation of this general approach is illustrated in flowchart 700 of FIG. 7. In particular, flowchart 700 represents a method for loading code elements included in a plurality of software entities comprising a target software entity and one or more reference software entities to facilitate analysis of the target software entity by a code analysis tool in accordance with an embodiment. In an embodiment, each of the software entities comprises a MICROSOFT® .NET assembly, although this is merely one non-limiting example. In a further embodiment, the code analysis tool comprises a static code analysis tool. However, the method may conceivably be used to load code elements for other types of code analysis tools. As previously noted, the code elements may comprise one or more of a type, method, property, field and event, although these examples are not intended to be limiting.

Although the method of flowchart 700 will be described herein in reference to various elements of system 100 as described above in reference to FIG. 1, persons skilled in the relevant art(s) will readily appreciate that the method is not limited to that implementation and may be implemented by other systems or elements.

The method of flowchart 700 may be performed by static code analysis module 130 responsive to receiving an indication from a user that the user wishes for an analysis to be performed on target software entity 142 in collection of software entities 140.

As shown in FIG. 7, the method of flowchart 700 begins at step 702 in which code element loader 132 loads all of the code elements included in target software entity 142. These code elements are deemed core code elements that must be loaded in order to facilitate obtaining suitable definitions thereof. As noted above, loading a code element may comprise accessing the software entity in which the code element is included on hard disk drive 108 (or other non-volatile storage device or system) and reading the code element, or a portion thereof, into system memory 114. As noted above, this step may comprise assigning the code elements included in target software entity to a particular ring in a plurality of rings.

At step 704, code element loader 132 selectively loads only a subset of the code elements included in reference software entities 144, wherein the determination of whether a code element included in a reference software entity is loaded is based on a degree to which a code element included in target software entity 142 depends on the code element included in the reference software entity. As discussed above, the degree to which a code element included in target software entity 142 depends on a code element included in the reference software entity may be reflected by the assignment of the code element included in the reference software entity to a particular ring in a plurality of rings.

Figure 8:
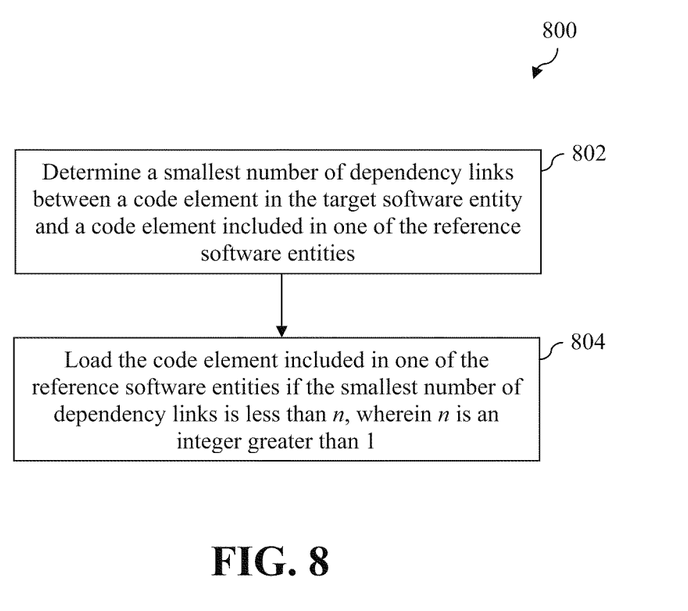
FIG. 8 depicts a flowchart of a particular method for performing a step of the flowchart depicted in FIG. 7.

FIG. 8 depicts a flowchart of a particular method for performing step 704 of flowchart 700. As shown in FIG. 8, the method of flowchart 800 begins at step 802, in which code element loader 132 determines a smallest number of dependency links between a code element in target software entity 142 and a code element included in one of reference software entities 144. This step may further include assigning the code element included in one of reference software entities 144 to a particular ring in a plurality of rings based on the determined smallest number of dependency links.

At step 804, code element loader 132 loads a code element included in one of reference software entities 144 if the smallest number of dependency links between the code element in the reference software entity and the code element in target software entity 142 is less than n, wherein n is an integer greater than 1. In an embodiment, the smallest number of dependency links determines which ring the code element was assigned to and so this step also encompasses loading a code element based on which ring it was assigned to. In the example embodiment described above in reference to FIG. 6, n is equal to 2. Consequently, code elements 2 and 3 in second ring 604 are loaded, since the smallest number of dependency links between those code elements and code element 1 is less than 2, while code elements 4 and 5 in third ring 606 are not loaded, since the smallest number of dependency links between those code elements and code element 1 is equal to 2. However, persons skilled in the relevant art(s) will readily appreciate that n may be any integer value greater than 1 such that any number of rings of dependent code elements may be selectively loaded depending upon the desired implementation.

The method of flowchart 800 may further include the step of creating a named placeholder for a code element included in one of reference software entities 144 if the smallest number of dependency links between the code element in the reference software entity and the code element in target software entity 142 is equal to n, wherein n is defined as above. Thus, with continued reference to the example embodiment described above in reference to FIG. 6 in which n is equal to 2, named placeholders are created for code elements 4 and 5 in third ring 606 because the smallest number of dependency links between those code elements and code element 1 is equal to 2. However, as noted above, various other values of n may be used.

III. Example Computer System Implementation

Figure 9:
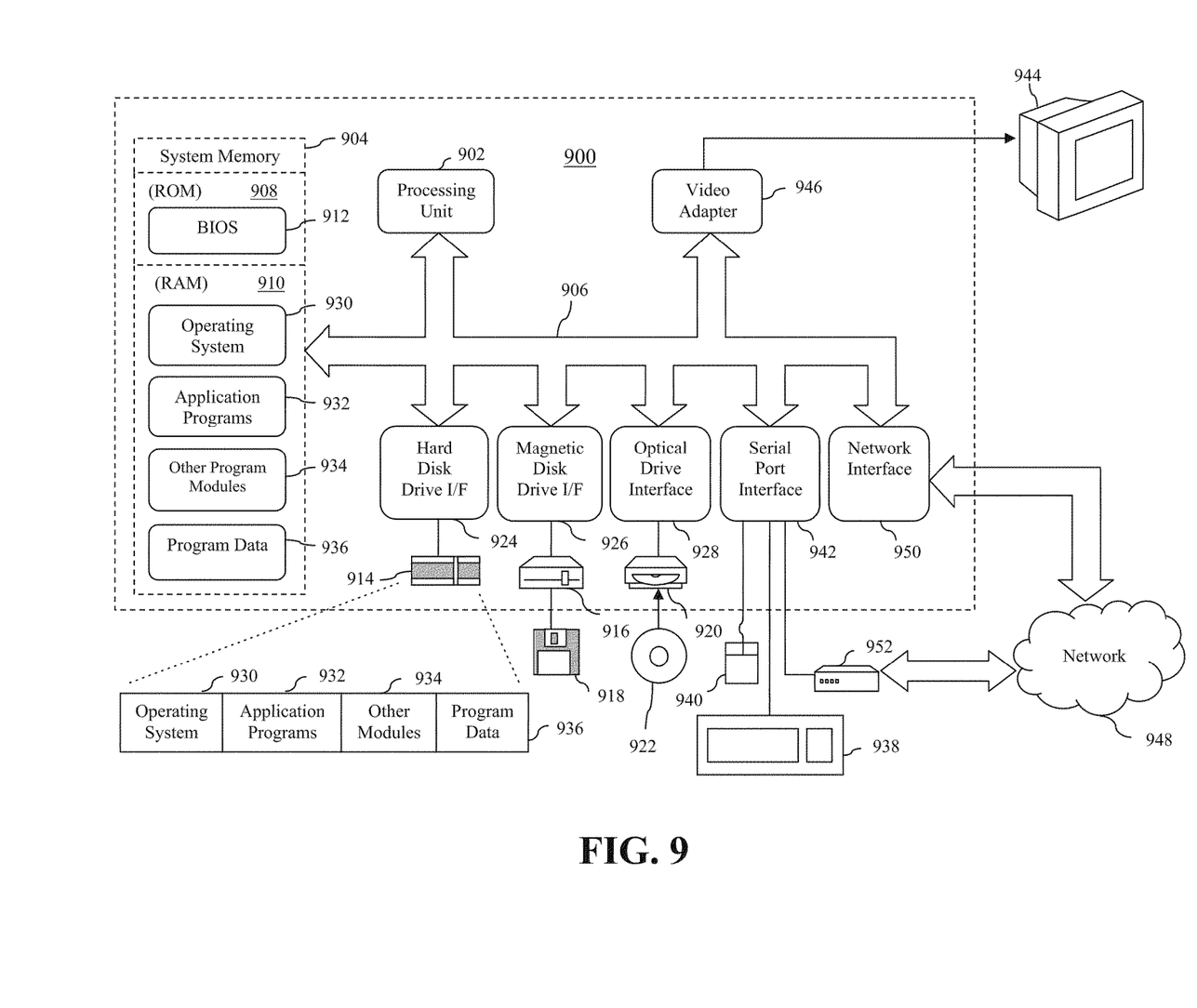
FIG. 9 depicts an example computer system that may be used to implement various aspects of the embodiments.

FIG. 9 depicts an example computer 900 that may be used to implement system 100 as described above in reference to FIG. 1. Computer 900 may represent a general-purpose computing device in the form of a conventional personal computer, a mobile computer, or a workstation, for example, or computer 900 may be a special purpose computing device. The description of computer 900 provided herein is provided for purposes of illustration, and is not intended to be limiting. Embodiments may be implemented in further types of computer systems, as would be known to persons skilled in the relevant art(s).

As shown in FIG. 9, computer 900 includes a processing unit 902, a system memory 904, and a bus 906 that couples various system components including system memory 904 to processing unit 902. Processing unit 902 may comprise one or more processors or processing cores. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computer 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, any of the software modules described herein, such as any of the software modules described in reference to FIG. 1, as well as logic for performing any of the various method steps described herein, such as logic for performing any of the method steps of flowcharts 400, 500, 700 or 800.

A user may enter commands and information into the computer 900 through input devices such as keyboard 938 and pointing device 940. Other input devices (not shown) may include a microphone, joystick, game controller, scanner, or the like. These and other input devices are often connected to the processing unit 902 through a serial port interface 942 that is coupled to bus 906, but may be connected by other interfaces, such as a parallel port, game port, or a universal serial bus (USB).

A monitor 944 or other type of display device is also connected to bus 906 via an interface, such as a video adapter 946. In addition to the monitor, computer 900 may include other peripheral output devices (not shown) such as speakers and printers.

Computer 900 is connected to a network 948 (e.g., a local area network or wide area network such as the Internet) through a network interface or adapter 950, a modem 952, or other means for establishing communications over the network. Modem 952, which may be internal or external, is connected to bus 906 via serial port interface 942.

As used herein, the terms "computer program medium" and "computer-readable medium" are used to generally refer to media such as the hard disk associated with hard disk drive 914, removable magnetic disk 918, removable optical disk 922, as well as other media such as flash memory cards, digital video disks, random access memories (RAMs), read only memories (ROM), and the like.

As noted above, computer programs and modules (including application programs 932 and other program modules 934) may be stored on the hard disk, magnetic disk, optical disk, ROM, or RAM. Such computer programs may also be received via network interface 950 or serial port interface 942. Such computer programs, when executed or loaded by an application, enable computer 900 to implement features of embodiments discussed herein. Accordingly, such computer programs represent controllers of the computer 900.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A computer-implemented method for loading into a system memory code elements included in a plurality of software entities stored on one or more non-volatile storage devices, the plurality of software entities comprising a target software entity and one or more reference software entities, a portion of the code elements being loaded into the system memory for analysis of the target software entity by a code analysis tool, the method comprising:
    assigning, automatically, a first subset of the code elements to a first group based on a dependency analysis, the first subset of the code elements including each code element of the target software entity and each code element of the one or more reference software entities that have at most a first number of dependency links from the target software entity as indicated by the dependency analysis;
    assigning, automatically, a second subset of the code elements to a second group, the second subset including each code element of the one or more reference software entities that have a second number of dependency links, that is one more than the first number of dependency links, from the target software entity as indicated in the dependency analysis, the first subset being mutually exclusive of the second subset;
    loading, automatically, only the code elements assigned to the first group into the system memory for analysis of the target software entity by the code analysis tool, loading a code element comprising accessing the software entity in which the code element is included;
    creating a named placeholder, for each code element in the second subset of code elements, in place of each code element in the second subset of code elements; and
    performing the analysis of the target software entity on the loaded code elements of the first subset of code elements and the named placeholder for each code element in the second subset of code elements, and without using the second subset of code elements.

2. The method of claim 1, wherein the code elements comprise one or more of a type, method, property, field, event and attribute.

3. The method of claim 1, wherein the first group comprises a first ring and a second ring, and the first number of dependency links is 1, and wherein assigning the first subset of the code elements to the first group comprises:
    assigning to the first ring all of the code elements included in the target software entity; and
    assigning to the second ring any code element included in the one or more reference software entities upon which a code element included in the target software entity directly depends.

4. The method of claim 3, wherein assigning to the second ring any code element included in the one or more reference software entities upon which a code element included in the target software entity directly depends comprises:
    reading metadata of the target software entity to identify code elements included in the one or more reference software entities upon which a code element included in the target software entity directly depends.

5. The method of claim 3,
    wherein the second group comprises a third ring, and the second number of dependency links is 2,
    wherein assigning the second subset of the code elements to the second group comprises assigning to the third ring any code element included in the one or more reference software entities that have not been assigned to the second ring and upon which a code element assigned to the second ring directly depends, and
    wherein the method further comprises creating the named placeholder for each code element that is assigned to the third ring.

6. The method of claim 5, wherein assigning to the third ring any code element included in the one or more reference software entities upon which a code element assigned to the second ring directly depends comprises:
    reading metadata of the one or more reference software entities to identify code elements included in the one or more reference software entities upon which a code element assigned to the second ring directly depends.

7. The method of claim 5, further comprising:
    not loading any code elements in the plurality of code elements that have not been assigned to the first group and the second group; and
    not creating a named placeholder for any code elements in the plurality of code elements that have not been assigned to the first group and the second group.

8. A system comprising:
    a processing unit;
    a system memory; and
    at least one non-volatile storage device that stores software modules to be executed by the processing unit, the software modules including a code analysis tool that comprises a code element loader that loads into the system memory a portion of code elements included in a plurality of software entities stored in the at least one non-volatile storage device and comprising a target software entity and one or more reference software entities and a static code analyzer that performs a code analysis on the target software entity based on the loaded code elements;

the code element loader being configured to:
- automatically assign a first subset of the code elements to a first group based on a dependency analysis, the first subset of the code elements including each code element of the target software entity and each code element of the one or more reference software entities that have at most a first number of dependency links from the target software entity as indicated by the dependency analysis;
- automatically assign a second subset of the code elements to a second group, the second subset including each code element of the one or more reference software entities that have a second number of dependency links, that is one more than the first number of dependency links, from the target software entity as indicated in the dependency analysis, the first subset being mutually exclusive of the second subset;
- automatically load into the system memory only the code elements assigned to the first group, and load a code element by accessing the software entity in which the code element is included; and
- create a named placeholder, for each code element in the second subset of code elements, in place of each code element in the second subset of code elements; and the static code analyzer being configured to perform the code analysis of the target software entity on the loaded code elements of the first subset of code elements and the named placeholder for each code element in the second subset of code elements, and without using the second subset of code elements.

9. The system of claim 8, wherein the code elements comprise one or more of a type, method, property, field, event and attribute.

10. The system of claim 8, wherein the first group comprises a first ring and a second ring, and the first number of dependency links is 1, and wherein the code element loader is configured to assign to the first ring all of the code elements included in the target software entity and to assign to the second ring any code element included in the one or more reference software entities upon which a code element included in the target software entity directly depends.

11. The system of claim 10, wherein the code element loader is configured to read metadata of the target software entity to identify code elements included in the one or more reference software entities upon which a code element included in the target software entity directly depends.

12. The system of claim 10, wherein the second group comprises a third ring, and the second number of dependency links is 2, and wherein the code element loader is configured to assign to the third ring any code element included in the one or more reference software entities that have not been assigned to the second ring and upon which a code element assigned to the second ring directly depends, and to create a named placeholder for each code element in assigned to the third ring.

13. The system of claim 12, wherein the code element loader is configured to read metadata of the one or more reference software entities to identify code elements included in the one or more reference software entities upon which a code element assigned to the second ring directly depends.

14. The system of claim 12, wherein the code element loader is configured to not load any code elements in the plurality of code elements that have not been assigned to the first group and the second group and to not create a named placeholder for any code elements in the plurality of code elements that have not been assigned to the first group and the second group.

15. A computer-implemented method for loading into a system memory code elements included in a plurality of software entities stored on one or more non-volatile storage devices, the plurality of software entities including a target software entity and one or more reference software entities, a portion of the code elements being loaded into the system memory for analysis of the target software entity by a code analysis module, the method comprising:
- loading into the system memory all of the code elements included in the target software entity, loading a code element comprising reading the software entity that includes the code element;
- selectively loading into the system memory only a subset of the code elements included in the one or more reference software entities, the subset being mutually exclusive of the code elements included in the target software entity, for analysis of the target software entity by the code analysis module, the determination of whether a code element included in a reference software entity is loaded being based on the code element included in the reference software entity having less than a first number of dependency links n from a code element included in the target software entity;
- creating a named placeholder, for each code element included in the one or more reference software entities having a second number of dependency links n+1 that is one more than the first number of dependency links n and that is not in the subset of code elements, in place of each code element included in the one or more reference software entities having the second number of dependency links n+1 and that is not in the subset of code elements; and
- performing the analysis of the target software entity on the loaded subset of the code elements included in the one or more reference software entities and the named placeholder for each code element included in the one or more reference software entities that is not in the subset of code elements, and without using unloaded code elements included in the one or more reference software entities.

16. The method of claim 15, wherein selectively loading only the subset of the code elements included in the one or more reference software entities comprises:
- determining a smallest number of dependency links between a code element included in the target software entity and a code element included in the one or more reference software entities; and
- loading the code element included in the one or more reference software entities if the smallest number of dependency links is less than n, wherein n is an integer greater than 1.

17. The method of claim 16, wherein n equals 2.

18. The method of claim 16, further comprising:
- creating a named placeholder for the code element included in the one or more reference software entities if the smallest number of dependency links is equal to n.

19. The method of claim 15, wherein the code elements comprise one or more of a type, method, property, field, event and attribute.

20. The method of claim 18, further comprising:
  not creating a named placeholder for the code element included in the one or more reference software entities if the smallest number of dependency links is greater than n.

* * * * *